United States Patent [19]

Young et al.

[11] Patent Number: 5,171,600
[45] Date of Patent: Dec. 15, 1992

[54] PROCESS FOR MAKING LOW FAT SNACK

[75] Inventors: Herbert T. Young; Richard W. Lodge; Donald L. McKenzie, all of Cincinnati; Richard L. Wilkins, Fairfield, all of Ohio

[73] Assignee: The Procter & Gamble Company, Cincinnati, Ohio

[21] Appl. No.: 629,876

[22] Filed: Dec. 19, 1990

[51] Int. Cl.$^5$ .............................................. A23L 1/217
[52] U.S. Cl. .................... 426/550; 426/438; 426/439; 426/510; 426/512; 426/560; 426/637; 426/808
[58] Field of Search ............... 426/560, 637, 510, 512, 426/808, 439, 438, 550; 99/450, 439, 432, 426; 249/144, 141, 113, 389

[56] References Cited

U.S. PATENT DOCUMENTS

| Re. 27,531 | 12/1972 | Murray et al. | 99/100 |
|---|---|---|---|
| 3,402,049 | 9/1968 | Mancuso et al. | 99/100 |
| 3,555,993 | 1/1971 | Garcia | 99/450 |
| 3,759,165 | 9/1973 | Wallace | 99/450 |
| 3,998,975 | 12/1976 | Liepa | 426/550 |
| 4,058,631 | 11/1977 | Roan | 426/52 |
| 4,283,425 | 8/1981 | Yuan et al. | 426/102 |
| 4,325,295 | 4/1982 | Caridis et al. | 99/339 |
| 4,366,749 | 1/1983 | Caridis et al. | 426/510 |
| 4,511,583 | 4/1985 | Olson et al. | 426/89 |
| 4,537,786 | 8/1985 | Bernard | 426/436 |
| 4,721,625 | 1/1988 | Lee et al. | 426/438 |
| 4,756,916 | 7/1988 | Dreher et al. | 426/302 |
| 4,933,199 | 6/1990 | Neel et al. | 426/438 |

FOREIGN PATENT DOCUMENTS

| 957896 | 11/1974 | Canada | 99/174 |
|---|---|---|---|
| 1151945 | 8/1983 | Canada | 99/174 |
| 03157 | 11/1985 | Netherlands . | |
| 1519049 | 9/1975 | United Kingdom | 1/216 |

*Primary Examiner*—Jeanette Hunter
*Assistant Examiner*—Mary S. Mims
*Attorney, Agent, or Firm*—Jerry J. Yetter; Rose Ann Dabek

[57] ABSTRACT

A process for preparing low fat shaped snack products having a light, crispy, crunchy texture is disclosed. A dough is formed from 50% to 80% flour, preferably potato flour, and water (20% to 50%), and formed into a sheet from which snack pieces are cut or are extruded. The snack pieces are constrained in a mold, fried to a moisture content of from about 5% to about 15% and then the excess fat removed by stripping with superheated steam having an average steam velocity of at least 800 lb./hr./ft.$^2$. A snack having 12% to 25% fat and having a fried-like texture and flavor and a moisture content less than 6% is made by this process.

19 Claims, 2 Drawing Sheets

PROCESS FOR MAKING LOW FAT SNACK

TECHNICAL FIELD

This application relates to an improved snack product which is lower in fat than other fried snacks made from doughs. In particular, this application relates to a process for preparing such products from a farinaceous dough in which the dough pieces are fried in oil in a constraining mold and then excess fat or oil removed by stripping with superheated steam.

BACKGROUND OF THE INVENTION

A wide variety of farinaceous (starch and protein-based) snack food products are presently available to the consumer. Many of these products are presently available to the consumer. Many of these products are in the form of chips, strips, and extruded pieces. Most snack products contain a fairly high level of fat, either in the form of separately added ingredients, such as cheese, or in the form of fats and oils absorbed during frying, as in the case of corn or potato chips. While fat improves the flavor and palatability of these products, it also increases the caloric value of the product. Accordingly, it would be desirable to provide low fat snack products which have an attractive appearance, texture and taste.

There have been several attempts at lowering the fat content of potato chips and of potato snacks made from doughs. One method involved coating chips with an aqueous dispersion of a high amylose starch. This is said to produce a potato chip with minimal oil pick-up and low variation in the amount of oil absorbed. (see RE 27,531 of U.S. Pat. No. 3,597,227 issued to Muray, et al., 1971). Coating of breaded or batter food products with a film forming agent such as gelatin or starches is also said to lower oil absorption by the foods when they are fried (U.S. Pat. No. 4,511,583 issued to Olson, et al, 1985). An alternative coating on raw starch foods was described in U.S. Pat. No. 4,058,631 (Roan, 1977) which involves coating the food surface with an aqueous solution of alpha amylase enzyme. This is said to lower the fat absorption of the product during frying.

Other ways to lower the oil content involve coating a potato slice with oil and then finish cooking with microwave or steam or other heat; and frying potato slices until they are partially cooked and then drying them. See for example the following patents:

U.S. Pat. No. 4,756,916 to Dreher et al (assigned Frito Lay, 1988) describes a process for making a low fat potato chip wherein washed potato slices are partially coated with oil, blanched at a temperature of 70°-100° C. and then baked to a temperature at least 200° C. When the moisture content of the partially dried slices is reduced to 10-25%, the slices can be further baked at a lower temperature (145°-160° C.) to finish drying the slices to a moisture content of 2 weight %. The product is said to have the texture, flavoring and color characteristics of a conventional fried chip.

U.S. Pat. No. 3,402,049 to Mancuso et al (assigned General Foods, 1968) describes a process for making potato chips having a total fat content of 20-30% by weight. Raw potato slices are soaked in an edible fat, drained to remove excess fat and then heated to elevated temperatures to surface fry and dehydrate the potato slices.

U.S. Pat. No. 45,283,425 to Yuan et al (General Foods, 1981) describes a potato chip having a fat content of up to 10%. This chip is prepared by coating raw potato slices with a globular protein, applying a layer of edible oil on top of the protein coating, and then subjecting the raw coated slices to microwave heating.

Canadian Patent 1,151,945 issued to Mehta et al (General Foods, 1983) describes a potato chip having a low fat content which is prepared by microwave heating. Before microwave heating, the raw potato slices are coated with an edible oil sufficient to bring the fat content to 20%.

Stripping the fat from fried potato chips by steam or hot air has also been used. See for example:

U.S. Pat. No. 4,537,786 issued to Bernard (Frito Lay, 1985) describes a process for manufacturing a low oil fried potato chip wherein the potato slices are fried in oil to a temperature of about 280°-320° F. (138° C.-160° C.), removed from the oil, and then contacted with an oil removing blast of hot air for from 1-10 minutes. This hot air removes the excess oil as well as finishes cooking the chip.

Canadian Patent 957,896 issued to Hai et al (General Foods, 1974) describes a process for decreasing the fat content of fried chip-type potato products. The fried food product is centrifuged at at least 352G of force while being contacted with superheated steam or saturated steam. The heat and steam remove the fat and finish cooking the chips.

U.S. Pat. No. 4,721,625 to Lee et al (Borden, 1988) describes a process for preparing low fat potato chips in which peeled raw potato chips are fried in oil to a moisture content of $10 \geq 25\%$ by weight. The partially fried potato slices are protected against oxidation, and the oil is removed from the surface. The chips are then dried to a moisture content of 1.5-3%. Superheated steam is used to remove the fat from the chips. The superheated steam can be used as a drying agent also.

The above processes apply to whole potato slices and are not easily adapted to products made from doughs and fried in constraining molds. These molds serve two functions:

1. to hold and shape the product; and
2. to transfer the heat into the product. However, they also hold fat which can absorb into the product after it is removed from the frying oil.

It is an object of this invention to make a shaped snack food with a lower fat content (between about 12% to about 25%) which has the texture and flavor of a fried snack by using superheated steam to strip the fat from the product immediately after frying.

SUMMARY OF THE INVENTION

The present invention relates to a process for making a low fat snack product.

This process comprises the steps of:
(a) forming a dough comprising:
  (1) from about 50% to about 80% of a starch-based flour;
  (2) from about 0% to about 5% emulsifier;
  (3) from about 20% to about 50% added water;
(b) forming a thin snack piece; and
(c) frying said snack pieces to a moisture content of from about 5% to about 15% in a constraining mold, and removing the excess fat with superheated steam while concurrently lowering the water content to less than 6%, preferably below 4%. The steam has an average steam density of at least 800 lb./hr./ft.$^2$ and an impingement density of at least 1000 lb./hr./ft.$^2$.

The dough can be formed into a sheet and then cut into snack pieces, or formed directly into snack pieces, preferably by extrusion.

The snack pieces are cooked at a temperature sufficient to form snack products having a light, crispy, crunchy texture, a fat content of for about 12% to about 25%. The stripping process removes the excess fat and lowers the fat content of the chip.

All percentages and proportions are "by dry weight" unless otherwise specified. Dry weight means on a water-free basis.

DESCRIPTION OF THE FIGURES

FIGS. 3 and 4 represent the mold and steam nozzle arrangement used in Example 1.

FIG. 4 shows the bottom view of the steam nozzle (5) containing holes (6) that are 0.052D (#55 drill). The pitch between the holes in the same rows is 3/16 of an inch. The distance between the center lines of each row is 0.1 inch. The nozzle or pipe (5) is ⅜ inch stainless steel tubing.

DETAILED DESCRIPTION OF THE INVENTION

A. Dough Formulation

Figure 1:
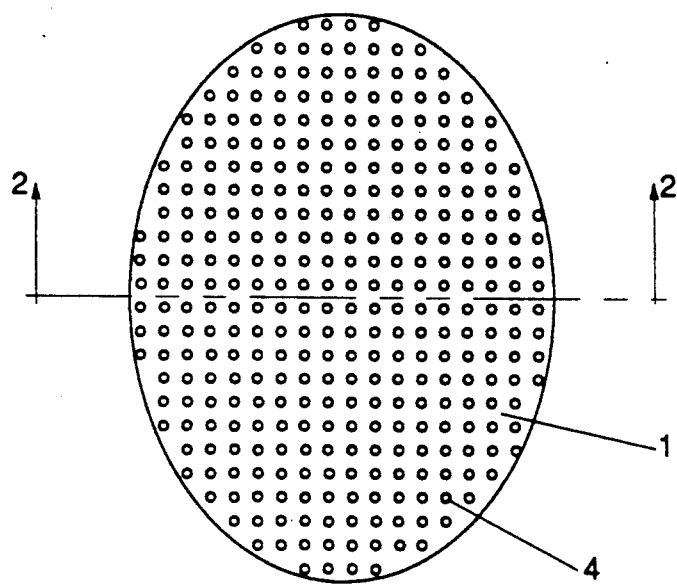
FIG. 1 is a mold (1) for holding the dough (2) during cooking. The mold is perforated or contains holes (4).

The dough is prepared from starch-based flour and water. Preferably starches, an emulsifier, and other optional ingredients described hereafter are added. The composition of the dough controls the ease with which the dough is processed into a sheet or molded pieces and also the textural and flavor features of the final product.

An important component of this dough is a starch-based flour. Potato flour is a most preferred source. Suitable sources of potato flour include, dehydrated potato flakes and granules, mashed potato materials, and dried potato products. Other tuber and grain flours such as yellow corn, white corn, popcorn, tapioca, peanut, wheat, oat, rice, and soy meal can be used in the dough. These starch-based flours can be blended to make snacks of different composition and flavor. Potato flour can be blended with starches, preferably potato starch, tapioca starch, cornstarch, oat starch, rice starch and wheat starch.

Hydrolyzed starches are useful additives for improving the processability of doughs having relatively low water levels. Preferred hydrolyzed starches have Dextrose Equivalent (D.E.) values of from about 5 to about 30, preferably from about 10 to about 20. Maltrin® M050, M100, M150, M180, M200, and M250 (available from Grain Processing Corporation, Iowa) are preferred maltodextrins. The D.E. value is a measure of the reducing equivalence of the hydrolyzed starch referenced to dextrose and expressed as a percent (on a dry basis). The higher the D.E. value, the more reducing sugars are present.

Hydrolyzed starches can be included in the dough in an amount of from 0% to about 15%, preferably 3% to 12%.

Another ingredient of the dough is water. As used herein, the term "added" refers to water which has been added to the dry dough ingredients. Water which is inherently present in the dry dough ingredients, such as in the case of flour and starches, is not included in the added water. The level of water in flours and starches is usually from about 3% to about 8%. If maltodextrin or corn syrup solids are added as a solution or syrup, the water in this syrup or solution must be accounted for as "added water". The doughs of the present invention can comprise from about 20% to about 50% added water, preferably from 30% to 41% added water.

Emulsifiers can be included in the doughs, typically in minor amounts up to about 5% by weight, preferably from about 0.5% to about 3%, and most preferably from about 1.5% to about 2.5%. Emulsifiers are used as a sheeting aid to avoid overworked sticky doughs and to reduce puffing and blistering in the cooked product.

Preferred emulsifiers are mono- and diglycerides of saturated and unsaturated fatty acids, and in particular mono- and diglycerides of stearic and palmitic acids. Surcrose mon- and diesters of saturated and unsaturated long chain fatty acids can also be used as can other emulsifiers such as polyglycerol esters or polyethoxysorbitan esters.

Salt, flavorings, and/or seasonings can also be optionally included in the dough or sprinkled on the surface of the snack after frying. Flavors and flavor precursors can also be added to the dough. Reducing sugars, i.e. fructose, glucose and maltose add browned notes to the cooked dough. Sucrose can also be added to provide added flavor. High fructose corn syrup solids can also be used for added flavor.

The dough can be prepared by any suitable method for combining together the previously described ingredients. Typically, a loose, dry dough is prepared by thoroughly mixing the flour, emulsifier, flavoring (optional) with sufficient added water to obtain the required added water levels. Preferred devices for mixing together these dough ingredients are conventional mixers. Hobart ® mixers are used for batch operations and Turbolizer ® mixers can be used for continuous mixing operations. However, extruders can also be used to mix the dough and to form sheets for cutting or for forming shaped dough pieces.

B. Sheeting and Snack Piece Formation

Once prepared, the dough is then formed into a relatively flat, thin sheet or thin snack pieces. By "thin" herein is meant from about 0.015 to about 0.1 inches (0.038 cm to 0.25 cm). Any method suitable for forming sheets from starch-based doughs can be used. For example, the sheet can be rolled out between two counter-rotating cylindrical rollers to obtain a uniform, relatively thin sheet of dough material. Any conventional sheeting, milling and gauging equipment can be used.

Doughs of the present invention are usually formed into a sheet having a thickness of from about 0.015 to about 0.10 inches (from about 0.038 to about 0.25 cm), and preferably to a thickness of from about 0.015 to about 0.025 inches (from about 0.038 to about 0.062 cm).

The dough sheet is then cut into snack pieces of a predetermined size and shape using any suitable stamping or cutting equipment. The snack pieces can be cut or formed into a variety of shapes. For example, in the shape of ovals, squares, circles, a bowtie, a star wheel, or a pin wheel.

The dough can also be extruded and formed into thin snack pieces through a shaping die. Conventional extruders can be used for this purpose. Twin screw extruders, such as those available from Werner Pfleiderer (Germany), are preferred because the dough moves through more uniformly and doesn't stick to the screw flights. Single screw extruders can also be used. Single screw extruders are available from Wenger in the U.S.

The dough can also be mixed in the extruder. In this case, usually the dry ingredients are added to the hopper and water is added in the extruder barrel. This is also a conventional forming process in snack foods.

C. Frying the Snack Pieces

Figure 2:
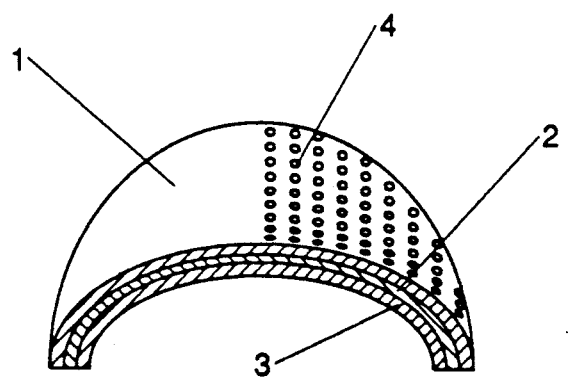
FIG. 2 shows a cross section view of the mold (1) containing the dough (2). The mold is in two pieces. The top is shown by (1) and the bottom is designated by (3).

The snacks are constrained during frying. An apparatus as described in U.S. Pat. No. 3,626,466 (Liepa, 1971) can be used and is preferred. The dough pieces are shaped using a movable, apertured mold half (as depicted in FIG. 1) to shape the cut dough pieces and then held during subsequent frying by a second apertured mold half. (See FIG. 2.) It is important that the molds contain holes or apertures. These holes control the water release during cooking and moderate the rate of evaporation. About 20% to 45% of the mold surface is occupied by these holes. Preferably the molds are made of stainless steel, but ceramic or other materials can be used.

Typical frying oils include fats and oils derived from animal and vegetable sources. Any number of unhydrogenated or partially hydrogenated oils, such as soybean, cottonseed, peanut, corn, palm oil, cottonseed oil, canola oil, rapeseed oil, sunflower seed oil, lard, tallow, peanut oil, among others can be used. Polyol polyesters of fatty acids can also be used, as can synthetic triglycerides. These includes low calorie and nonabsorbable fats such as sucrose polyesters. See for example, Mattson et al U.S. Pat. No. 3,600,186 and Jandacek U.S. Pat. No. 4,005,195 which describe these fats.

The shaped, constrained pieces are passed through an oil bath either in a batch mode or in a continuous fryer.

The snack pieces can be fried to moisture contents of about 5% to about 15%. Preferably the snack pieces have a moisture content of 10% to 15% when exiting the fryer. The level of moisture indirectly controls the amount of fat that is stripped off. The higher the moisture content the more oil is removed. While not wishing to be bound by theory, it is believed that the water vapor escapes from the center of the dough during this continued cooking carrying with it the fat entrained in the dough. The surface fat and this water vapor carried fat are removed by the steam treatment.

D. Steam Stripping and Final Cooking Step

Figure 3:
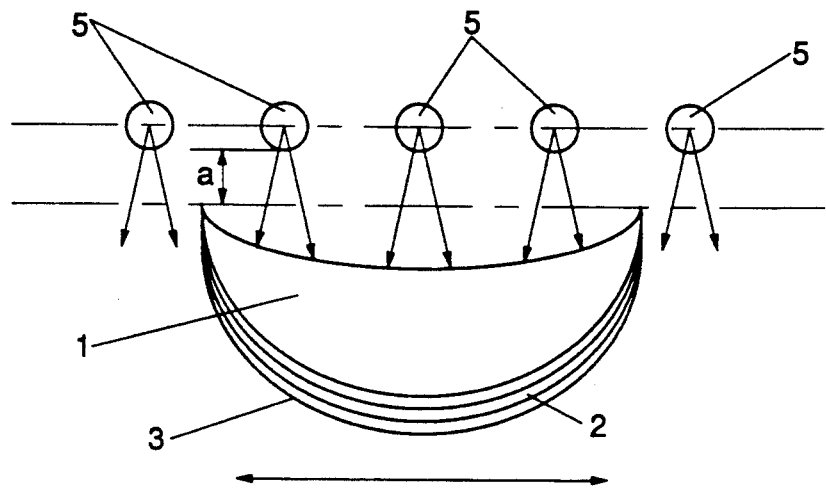
FIG. 3 shows a view of dough (2) held within a mold (1) and (3) that is traveling in the direction of the arrow. The pipes (5) for which the steam is applied to the dough constrained in the mold run perpendicular to the molds' direction of travel. This allows for a greater steam density. The distance A is a half inch.

The constraining apertured molds containing the partially fried snack piece are passed under steam or hot inert gas flow at a distance of from about 1.25 cm to 10 centimeters ($\frac{1}{2}$–4 inches) as soon as they emerge from the fryer. (See FIG. 3).

A jet of steam in the shape of a cone emerges from each hole in the pipe. The edge of the single cone is moderately well defined and can be detected experimentally by observing deflection of a thin flexible wire. By measuring the diameter of a non-impeded cone at the impingement distance, calculating the impingement area, and measuring steam flow rate per hole, steam impingement can be calculated. Steam impingement density is the amount of steam per hour per unit area in square feet at the mold. This represents the intensity within the cone of an impingement jet at the impingement distance. A second characteristic measurement is the average steam density which is total steam sprayed divided by the total area of product exposed toward the steam. The steam area includes the mold surface as well as the area between the molds. Average steam density takes into account the fact that the cone does not cover 100% of the product.

It has been found that a minimal steam impingement density is 1000 lb./hr./ft.$^2$ (4880 kg./hr./m$^2$), preferably 2000 lb./hr./ft.$^2$ (9760 kg./hr./m$^2$), and a minimal average density is 800 lb./hr./ft.$^2$ (3904 kg./hr./m$^2$), preferably 1000 lb./hr./ft.$^2$ is needed to lower the fat in this process.

The potential for this invention to remove oil is most strongly related to the difference in moisture level between the beginning and the end of exposure to stripping steam. The greater this difference, the more oil can be removed. The speed at which this happens is most strongly dependent on steam impingement density, average steam density, and temperature of the steam. Thus the amount of steam required, or said another way, the residence time under the steam, must be sufficient to achieve the desired moisture target. Preferably, the superheated steam has a temperature of from 300° F. (162° C.) to 450° F. (232° C.).

Figure 4:
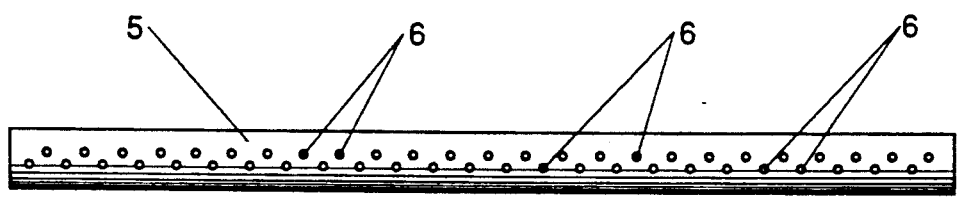

A preferred arrangement for forming the steam cones has the holes in the pipe staggered at 10–25 degree angles from adjacent holes in the pipes. That is, as to a vertical plane in the center of the pipe, the holes are alternately 10°–25° on both sides of the center plane. The holes are from about 3/16 to $\frac{1}{2}$ inches apart (0.46 to 1.25 cm). FIG. 4 shows a geometry that makes this steam density. Other arrangements for the holes in the pipe include a linear arrangement. Spray nozzles can be used to control the steam spray also. These nozzles would be used in place of a pipe with the holes. Regardless of the nozzle geometry used, to assure even browning of the product, the steam impingement density should be uniform in the direction perpendicular to the movement of a mold.

It is advantageous to the practice of this invention that the steam treatment be immediately after the frying step. The more quickly the chips are exposed to the steam, the lower the oil content of the snack. This allows the product to pass from the fryer into the veil of steam. The exact geometry of the mold in relation to the steam vent is not critical. That is, it can be oriented in any direction under the pipe.

The snack products made from this process typically have from about 12% to about 25% fat. Preferably, the cooked snacks will have from about 15% to about 20% fat content (dry weight basis). The steam treatment lowers the moisture content of the snack pieces to below about 6%, preferably below 4%, and most preferably about 2%. The steam keeps the molds hot and therefore cooking continues during the stripping operation. The more heat sensitive the snack piece flavor is, the higher the final moisture content should be. That is for potato with a high reducing sugar content, a moisture of 2% is preferred. This prevents cooked or burnt flavor in the final product.

To improve the flavor and lubricity of the snack, oil can be sprayed onto the snack product when it emerges from the frying and stripping steps or when it is removed from the mold used in constrained cooking. Oils with characteristic flavors or highly unsaturated oils can be sprayed on the snack product. Oils such as olive oil, avocado oil, safflower oil, sesame oil, walnut oil, rice oil, rice bran oil or peanut oils can be used. In addition, oils with added flavors can be used. These include butter flavored oils, natural or artificial flavored oils, herb oils and oils with garlic or onion flavors added. This is a way to introduce a variety of flavors without having the flavor undergo browning reactions during the cooking. It also avoids adding a flavor to the dough. This method can be used to introduce healthier oils which would ordinarily undergo polymerization or oxidation during the heating necessary to fry the snacks.

The more oil on the surface of the chip or snack, the more lubricious the product tastes. Oil within the snack is not perceived as being lubricious. Oil spray can be used to increase the oil content of the snack piece from the 12% to 25% fat content it has as it emerges from the steaming step. Oil spray raises the fat to as high as 35% oil or fat for the entire snack piece.

While this invention has been illustrated using potato flour and starches, the process is equally applicable to other farinaceous products, e.g. wheat, yellow and white corn, rye, barley, rice and mixtures thereof.

SPECIFIC EXAMPLES OF PROCESS OF PRESENT INVENTION

The process of the present invention is illustrated by the following specific examples:

EXAMPLE 1

A mix consisting of approximately 58.6% potato flour, 40.4% water and 1.0% Duex ® emulsifier (a mixture of mono-, di-, and triglycerides available from Procter & Gamble, Cincinnati, Ohio) is prepared by mixing the ingredients for two minutes in a single speed domestic food processor, forming a loose, dry dough. The dough is sheeted by feeding the dough through a pair of commercial 8" mill rolls forming a smooth elastic sheet controlled to a thickness of about 0.020 inches (0.05 cm). The dough sheet is then cut into oval shaped pieces. These pieces are placed in a constrained cooking mold consisting of 6 pairs of perforated stainless steel halves. These filled molds are then passed through a continuous fryer with cottonseed oil at 375° F. (190° C.) for a time sufficient to lower the moisture content to about 10% to 15%. The mold apparatus is then removed from the oil and passed into a hot atmosphere of superheated steam, air, or inert gas held at 350° F. (177° C.). Superheated steam is sprayed over the mold apparatus by nozzles constructed from ⅜ inch (0.9 cm) stainless steel tubing. Each tube is drilled with two rows of #55 holes (0.052 inches, 0.13 cm) running the length of the tube. The rows are spaced 15° apart as measured from the center of the tube. The pitch between the holes within a row is 3/16 of an inch (0.46 cm). The five tubes are oriented parallel to each other, one inch (2.5 cm) apart and perpendicular t the direction of the molds. The holes are in a staggered pattern (see FIG. 4). The apparatus can be moved perpendicular to the axis of the tubes providing an even spray of steam for the entire length the molds travel.

Exposure time under the steam is about 20 seconds or sufficient to lower moisture to 2% or less without over-browning. The fat level of the finished product is 17%.

The average steam density is 1400 lb./hr./ft.$^2$ and the impingement density is 2600 lb./hr./ft$^2$.

The product has light, crisp texture and flavor quite close to a deep fried version of the chip. Any small differences originate from the two-fold difference in fat level.

What is claimed is:

1. A process for making a farinaceous snack having a fat content of from about 12% to about 25% comprising the steps of:
   (a) forming a dough comprising:
      (1) from about 50% to about 80% of a source of starch-based flour;
      (2) from about 0% to about 5% emulsifier;
      (3) from about 20% to about 50% added water;
   (b) forming the dough into a thin snack piece;
   (c) frying said snack pieces in a mold to a moisture content of from about 5% to about 15% and;
   (d) removing the fat and concurrently lowering the moisture content to less than about 6% by passing the constrained snack under superheated steam having temperatures of from 300° F. (162° C.) to 450° F. (232° C.) and having an average steam density of at least 800 lb./hr./ft.$^2$ and an impingement density of at least 100 lb./hr./ft.$^2$.

2. A process according to claim 1 wherein said snack pieces are formed by extrusion.

3. A process according to claim 1 wherein said mold is perforated.

4. A process according to claim 3 wherein said snack is fried by immersion in vegetable oil at a temperature of from 300° F. (148° C.) to 425° F. (218° C.).

5. A process according to claim 4 wherein said steam has an average impingement density of from 1500 to 2700 lb./hr./ft.$^2$.

6. A process according to claim 5 wherein said oil is selected from the group consisting of vegetable oils and partially hydrogenated vegetable oils.

7. A process of claim 6 wherein the dough is formed into a sheet having a thickness of from about 0.015 to about 0.035 inches (from about 0.038 cm to about 0.088 cm) and said snack piece is cut from said sheet.

8. A process of claim 7 wherein said dough additionally comprises from about 0.5% to about 12% sugar selected from the group of sucrose, glucose, fructose, maltodextrins and mixtures thereof.

9. A process of claim 8 wherein said flour is potato flour selected from the group consisting of potato flakes, potato granules and mixtures thereof.

10. A process of claim 9 wherein said dough contains from 0.5% to about 3% emulsifier.

11. The process of claim 10 wherein said emulsifier is a mixture of mono- and diglycerides of saturated and unsaturated fatty acids.

12. The process of claim 7 wherein the dough comprises at least about 20% added water.

13. The process of claim 12 wherein the dough comprises from about 55% to about 80% flour.

14. The process of claim 13 wherein the dough comprises from about 3% to about 15% maltodextrin, having a D.E. of from 10 to 20.

15. The process of claim 14 wherein the dough sheet is cut into an oval shaped dough pieces.

16. A process according to claim 1 comprising the additional step of spraying from about 1% to about 10% spray oil on the cooked snack product thereby increasing the fat content to from about 15% to about 25%.

17. A process according to claim 16 wherein said spray oil is selected from the group consisting of olive oil, avocado oil, safflower oil, sesame oil, walnut oil, peanut oil, cottonseed oil, soybean oil, sunflower oil, canola oil, rice bran oil, flavored oils and mixtures thereof.

18. A process according to claim 2 wherein the average steam density is from 1000 to 2700 lb./hr./ft.$^2$.

19. A process according to claim 15 wherein the steam impingement density is from 100 to 2000 lb./hr./ft.$^2$.

* * * * *